(12) United States Patent
Hedstrom et al.

(10) Patent No.: US 6,477,471 B1
(45) Date of Patent: Nov. 5, 2002

(54) PRODUCT DEFECT PREDICTIVE ENGINE

(75) Inventors: John R. Hedstrom, Garland, TX (US); Dan A. Watson, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 896 days.

(21) Appl. No.: 08/741,494

(22) Filed: Oct. 30, 1996

Related U.S. Application Data
(60) Provisional application No. 60/008,116, filed on Oct. 30, 1995.

(51) Int. Cl.[7] ............................................. G06F 19/00
(52) U.S. Cl. ............................. 702/34; 702/81; 703/22; 717/135
(58) Field of Search ................................. 364/552, 554, 364/468.16, 468.17; 702/34, 81; 703/22; 717/135; 700/109, 110

(56) References Cited

U.S. PATENT DOCUMENTS

| | | | | |
|---|---|---|---|---|
| 5,301,118 A | * | 4/1994 | Heck et al. | 364/468.16 |
| 5,452,218 A | * | 9/1995 | Tucker et al. | 364/468.17 |
| 5,581,466 A | * | 12/1996 | Van Wyk et al. | 364/552 |

OTHER PUBLICATIONS

Robert V. White, "An Introduction to Six Sigma with a Design Example", APEC '92 Seventh Annual Applied Power Electronics Conference and Exposition, Feb. 1992, pp.28–35.*

Fieler et al., "Defects Tail Off with Six–Sigma Manufacturing", IEEE Circuits and Devices Magazine, vol. 7, Iss. 5, Sep. 1991, pp. 18–20.*

Billy Mitchell, "The Six Sigma Appeal", Engineering Management Journal, vol. 2, Iss. 1, Feb. 1992, pp. 41–47.*

Fuller et al., "Total Quality Manufacturing at the RIT Integrated Circuit Factory", Proceedings of the Eleventh Biennial University/Government/Industry Microelectronics Symposium, May 1995, pp. 52–56.*

William K. Hoehn, "Robust Designs Through Design to Six Sigma Manufacturing", Proceedings of the 1995 IEEE Annual International Engineering Management Conference, Jun. 1995, pp. 241–246.*

* cited by examiner

Primary Examiner—Eric B. Stamber
(74) Attorney, Agent, or Firm—Robert L. Troike; Frederick J. Telecky, Jr.

(57) ABSTRACT

A software predictive engine is described that provides a tool to analyze the import of defects in the software development process. By providing a prediction of escaping defects, in terms of the normalized sigma measure and the predicted lines of code, together with historical data the impact of defects at the stages of the design can be predicted. As actual defects are measured predicted sigma level can also be predicted. The engine includes generating a defect containment matrix for the historical data and for the current software program being developed.

12 Claims, 18 Drawing Sheets

FIG. 6

| | A | B | C | D | E | F | G | H | I | J |
|---|---|---|---|---|---|---|---|---|---|---|
| 1 | DEFECTS OBSERVED | | | | | | | | | INSTRUCTIONS |
| 2 | | | PHASE ORIGINATED | | | | | | | |
| 3 | PHASE DETECTED | | RA | PD | DD | CUT | I&T | | | |
| 4 | | RA | 30 | | | | | | | 1.) Enter DPU from |
| 5 | | PD | 16 | 33 | | | | | | historical phase |
| 6 | | DD | 9 | 25 | 25 | | | | | containment data, |
| 7 | | CUT | 8 | 3 | 15 | 23 | | | | or best judgement. |
| 8 | | I&T | 1 | 1 | 5 | 17 | 3 | | | |
| 9 | | TOTAL | 64 | 62 | 45 | 40 | 3 | 214 | | |
| 10 | EST. TOTAL | | 67.37 | 65.96 | 48.39 | 43.48 | 3.33 | 228.52 | | |
| 11 | % SPREAD | | 0.299065 | 0.28972 | 0.21028 | 0.186916 | 0.014019 | | | |
| 12 | INSPECTION EFFICIENCIES | | | | | | | | | 2.) Based upon |
| 13 | | | PHASE ORIGINATED | | | | | | | estimated efficiency |
| 14 | PHASE DETECTED | | RA | PD | DD | CUT | I&T | | | of defect detection, |
| 15 | | RA | 45% | | | | | | | the inspection |
| 16 | | PD | 43% | 50% | | | | | | efficiencies are |
| 17 | | DD | 42% | 76% | 52% | | | | | calculated and |
| 18 | | CUT | 65% | 38% | 64% | 53% | | | | copied to |
| 19 | | I&T | 23% | 20% | 60% | 83% | 90% | | | the current sheet. |
| 20 | | | | | | | | | | |
| 21 | | | | | | | | | | |
| 22 | EST. EFFICIENCY | | 95% | 94% | 93% | 92% | 90% | | | 3.) Enter the |
| 23 | | | | | | | | | | estimated overall |
| 24 | | | | | | | | | | efficiency you judge |
| 25 | | | | | | | | | | the process to have |
| 26 | | | | | | | | | | to detect DPU |
| 27 | | | | | | | | | | of each type |
| 28 | | | | | | | | | | over all phases. |
| 29 | | | | | | | | | | |

FIG. 7A

|   | A | B | C | D | E |
|---|---|---|---|---|---|
| 1 | DSEG SOFTWARE SIGMA CALCULATIONS | | | | |
| 2 | PART 1--INITIAL VALUES OF | | | SLOC PHASE CONTAINMENT... | |
| 3 | PRODUCT NAME | | | | |
| 4 | PRODUCT OPPORTUNITIES | | | SLOC | 50000 |
| 5 | HISTORICAL SIGMA | | | SIGMA | 4.50 |
| 6 | | | | | |
| 7 | PHASE PROCESS EFFECTIVENESS (FROM PHASE CONTAINMENT DATA) | | | | |
| 8 | | | PHASE ORIGINATED | | |
| 9 | PHASE DETECTED | | RA | PD | DD |
| 10 | | RA | 45% | | |
| 11 | | PD | 43% | 50% | |
| 12 | | DD | 42% | 76% | 52% |
| 13 | | CUT | 65% | 38% | 64% |
| 14 | | I&T | 23% | 20% | 60% |
| 15 | EST. EFFICIENCY | | 94.74% | 93.62% | 92.47% |
| 16 | PLANNING DPU SPREAD BY PHASE | | | | |
| 17 | % SPREAD | | 30% | 29% | 21% |
| 18 | | | PHASE ORIGINATED | | |
| 19 | PHASE DETECTED | | RA | PD | DD |
| 20 | | RA | 142 | | |
| 21 | | PD | 76 | 154 | |
| 22 | | DD | 43 | 117 | 116 |
| 23 | | CUT | 38 | 14 | 69 |
| 24 | | I&T | 5 | 5 | 23 |
| 25 | | TOTAL | 302.42 | 289.89 | 208.17 |
| 26 | | PASSED | 15.92 | 18.50 | 15.67 |
| 27 | | GENERATE | 318.34 | 308.39 | 223.83 |
| 28 | UPPER | | | | |
| 29 | LIMITS | | PHASE ORIGINATED | | |
| 30 | PHASE DETECTED | | RA | PD | DD |
| 31 | | RA | 162 | | |
| 32 | | PD | 90 | 175 | |
| 33 | | DD | 54 | 135 | 134 |
| 34 | | CUT | 48 | 20 | 83 |

| F | G | H | I | J |
|---|---|---|---|---|
| Rel 0.06; May 12, 1995 | | | | |
| ...AND SIGMA HISTORY | | | | |
| | | | INSTRUCTIONS | |
| | | | 1.) Enter SLOC | |
| | | | 2.) Enter sigma from | |
| | | | historical data or | |
| | | | fault density of | |
| | | | similar programs. | |
| CUT | I&T | | | |
| | | | 3.) Go to historical | |
| | | | page and enter data. | |
| | | | The initial phase | |
| 53% | | | effectiveness is | |
| 83% | 90% | | computed and | |
| 91.30% | 88.89% | | copied to this page. | |
| 19% | 1% | | 4.) Adjust DPU | |
| | | | spread by %. | |
| CUT | I&T | | Initial load copied | |
| | | | from historical page. | |
| | | HISTORICAL | 5.) DPU spread | |
| 105 | | SIGMA | agrees with the | |
| 78 | 13 | 4.50 | initial sigma as | |
| 183.05 | 13.43 | 996.96 | stated in the | |
| 15.92 | 1.49 | 67.50 | cell to the left. | |
| 198.96 | 14.92 | 1064.45 | | |
| | | ALPHA_U | 6.) Enter upper | |
| CUT | I&T | 0.05 | limits alpha_U. | |
| | | | There is only an | |
| | | | alpha_U x 100% | |
| | | | chance that an | |
| 122 | | | actual will exceed | |

FROM FIG. 7A

TO FIG. 7D

FROM
FIG. 7A

|  |  |  |  |  |  |
|---|---|---|---|---|---|
| 35 |  | I&T | 9 | 8 | 31 |
| 36 |  | TOTAL | 363 | 338 | 248 |
| 37 |  |  |  |  |  |
| 38 | LOWER |  |  |  |  |
| 39 | LIMITS |  | PHASE ORIGINATED |  |  |
| 40 | PHASE DETECTED |  | RA | PD | DD |
| 41 |  | RA | 127 |  |  |
| 42 |  | PD | 65 | 138 |  |
| 43 |  | DD | 34 | 103 | 102 |
| 44 |  | CUT | 30 | 9 | 59 |
| 45 |  | I&T | 2 | 2 | 17 |
| 46 |  | TOTAL | 258 | 252 | 178 |
| 47 |  |  |  |  |  |
| 48 | DEFECTS OBSERVED |  |  |  |  |
| 49 |  |  | PHASE ORIGINATED |  |  |
| 50 | PHASE DETECTED |  | RA | PD | DD |
| 51 |  | RA | 132 |  |  |
| 52 |  | PD | 66 | 140 |  |
| 53 |  | DD | 35 | 105 | 105 |
| 54 |  | CUT | 35 | 11 | 52 |
| 55 |  | I&T | 5 | 5 | 20 |
| 56 |  | TOTAL | 274 | 261 | 188 |
| 57 | ESC. DEFECTS |  | 14.41 | 16.64 | 14.15 |
| 58 | CONFIDENCE LEVELS |  |  | CONF. | 95% |
| 59 | DPU |  | dpmo |  | THIS PROGRAM |
| 60 | DPU-UCL | 76.50 | dpmo-ucl |  | 1530 sigma-ucl |
| 61 | DPU | 60.70 | dpmo |  | 1214 sigma |
| 62 | DPU-LCL | 44.91 | dpmo-lcl |  | 898 sigma-lcl |
| 63 |  |  |  |  |  |
| 64 |  |  |  |  |  |
| 65 |  |  |  |  |  |
| 66 |  | EST λ* | 14.4066 | 16.63887 | 14.15054 |
| 67 |  | VAR(EST | 0.758242 | 1.062056 | 1.065094 |
| 68 |  |  |  |  |  |

FROM FIG. 7B

| | 93 | 20 | | the corresponding |
| --- | --- | --- | --- | --- |
| | 215 | 20 | 1184 | upper limits entry |
| | | | | given true historical |
| | | | | assumptions. |
| | | | ALPHA_L | 7.) Enter lower |
| | CUT | I&T | 0.1 | limits Alpha_L. |
| | | | | There is only an |
| | | | | Alpha_L x 100% |
| | | | | chance that an |
| | 92 | | | actual will be lower |
| | 67 | 9 | | than a corresponding |
| | 159 | 9 | 856 | lower limits entry |
| | | | | given true historical |
| | | | | assumptions. |
| | | | | 8.) Enter the actual |
| | CUT | I&T | | defects observed |
| | | | | at end of phase. |
| | | | PREDICT | |
| | 95 | | SIGMA | |
| | 68 | 12 | 4.53 | 9.) Predicted sigma. |
| | 163 | 12 | 897.40 | |
| | 14.17 | 1.33 | 60.70 | |
| | | | | 10.) CONF. is the |
| | | AVERAGE(SIMILAR) | | probability that the |
| | 4.62 | sigma-ucl | 4.55 | true dpmo, sigma |
| | 4.53 | sigma | 4.53 | are contained in |
| | 4.46 | sigma-lcl | 4.51 | the interval. |
| | | | | |
| | | | TOTAL | |
| | 14.17391 | 1.333333 | 60.70325 | |
| | 1.232514 | 0.148148 | 4.266054 | |

FROM FIG. 7C

|   | A | B | C | D | E |
|---|---|---|---|---|---|
| 1 |   |   |   | HISTORICAL INPUT |   |
| 2 |   |   |   |   |   |
| 3 | DEFECTS OBSERVED |   |   |   |   |
| 4 |   |   |   | PHASE ORIGINATED |   |
| 5 | PHASE DETECTED |   | RA | PD | DD |
| 6 |   | RA | 30 | 0 | 0 |
| 7 |   | PD | 16 | 33 | 0 |
| 8 |   | DD | 9 | 25 | 25 |
| 9 |   | CUT | 8 | 3 | 15 |
| 10 |   | I&T | 1 | 1 | 5 |
| 11 |   |   |   |   |   |
| 12 | EST. EFFICIENCY |   | 95.00% | 94.00% | 93.00% |
| 13 |   |   |   |   |   |
| 14 |   |   |   | ACTUAL DATA |   |
| 15 |   |   |   |   |   |
| 16 | DEFECTS OBSERVED |   |   |   |   |
| 17 |   |   |   | PHASE ORIGINATED |   |
| 18 | PHASE DETECTED |   | RA | PD | DD |
| 19 |   | RA | 132 | 0 | 0 |
| 20 |   | PD | 66 | 140 | 0 |
| 21 |   | DD | 36 | 105 | 106 |
| 22 |   | CUT | 35 | 11 | 62 |
| 23 |   | I&T | 5 | 5 | 20 |
| 24 |   |   |   |   |   |
| 25 | EST. EFFICIENCY |   | 94.74% | 93.62% | 92.47% |
| 26 |   |   |   |   |   |
| 27 |   |   |   | PREDICTIONS |   |
| 28 |   |   |   |   |   |
| 29 | CONFIDENCE LEVELS |   |   | CONF. | 95% |
| 30 | DPU |   | dpmo |   | THIS... |
| 31 | DPU-UCL |   | 76.50 | dpmo-ucl | 1530 | sigma-ucl |
| 32 | DPU |   | 60.70 | dpmo | 1214 | sigma |
| 33 | DPU-LCL |   | 44.91 | dpmo-lcl | 898 | sigma-lcl |
| 34 |   |   |   |   |   |

FROM FIG. 8B

FIG. 8B

| | F | G | H | I | J |
|---|---|---|---|---|---|
| | | | | | |
| | | | | | |
| | | | | | |
| | CUT | I&T | | | |
| | 0 | 0 | | | |
| | 0 | 0 | | | |
| | 0 | 0 | | | |
| | 23 | 0 | SLOC | 50000 | |
| | 17 | 3 | SIGMA | 4.50 | |
| | | | | | |
| | 92.00% | 90.00% | | | |
| | | | | | |
| | | | | | |
| | | | | | |
| | CUT | I&T | | | |
| | 0 | 0 | | | |
| | 0 | 0 | | | |
| | 0 | 0 | PREDICT | | |
| | 95 | 0 | SIGMA | | |
| | 68 | 12 | 4.53 | | |
| | | | | | |
| | 91.30% | 88.89% | | | |
| | | | | | |
| | | | | | |
| | | | | | |
| | ...PROGRAM | AVERAGE(SIMILAR) | | | |
| | 4.62 | sigma-ucl | 4.55 | | |
| | 4.53 | sigma | 4.53 | | |
| | 4.46 | sigma-lcl | 4.51 | | |

FROM FIG. 8A

FIG. 9A

| | A | B | C | D | E |
|---|---|---|---|---|---|
| 1 | DSEG SOFTWARE | | | | |
| 2 | PART 1--INITIAL VA | | | | |
| 3 | PRODUCT NAME | | | SLOC. PHASE CONT | |
| 4 | PRODUCT OPPORT | | UNITIES | SLOC | 50000 |
| 5 | HISTORICAL SIGMA | | | SIGMA | 4.50 |
| 6 | | | | | |
| 7 | PHASE PROCESS EF | | | | |
| 8 | | | PHASE ORIGINATED | | |
| 9 | PHASE DETECTED | | | | |
| 10 | | RA | =[MASK16.XLS]HIST | | |
| 11 | | PD | =[MASK16.XLS]HIST | =[MASK16.XLS]HIST | |
| 12 | | DD | =[MASK16.XLS]HIST | =[MASK16.XLS]HIST | =[MASK16.XLS]HIST |
| 13 | | CUT | =[MASK16.XLS]HIST | =[MASK16.XLS]HIST | =[MASK16.XLS]HIST |
| 14 | | I&T | =[MASK16.XLS]HIST | =[MASK16.XLS]HIST | =[MASK16.XLS]HIST |
| 15 | EST. EFFICIENCY | | =1-1/C76 | =1-1/D76 | =1-1/E76 |
| 16 | PLANNING DPU SPR | | | | |
| 17 | % SPREAD | | =[MASK16.XLS]HIST | =[MASK16.XLS]HIST | =[MASK16.XLS]HIST |
| 18 | | | PHASE ORIGINATED | | |
| 19 | PHASE DETECTED | | | | |
| 20 | | RA | =$A$78*$C$17*$C10 | PD | DD |
| 21 | | PD | =(A$78*C$17-C$20)* | =$A$78*$D$17*$D$11 | |

| F | G | H | I | J |
|---|---|---|---|---|
| Rel 0.06; May 12, 19 | AND SIGMA HISTOR | | | |
| | | | INSTRUCTIONS | |
| | | | 1.) Enter SLOC | |
| | | | 2.) Enter sigma from historical data or fault density of similar programs. | |
| CUT | I&T | | 3.) Go to historical page and enter data. The initial phase effectiveness is computed and copied to this page. | |
| =[MASK16.XLS]HIST | =[MASK16.XLS]HIST | | | |
| =[MASK16.XLS]HIST | =1-1/G76 | | | |
| =1-1/F76 | | | | |
| =[MASK16.XLS]HIST | =1-SUM(C17:F17) | | 4.) Adjust DPU spread by %. | |
| CUT | I&T | | Initial load copied from historical page. | |

FROM FIG. 9A

FROM FIG. 9A / TO FIG. 9D

| | | | | |
|---|---|---|---|---|
| 22 | DD | =(A$78*C$17-C$20-C | =(A$78*D$17-D$21)* | =$A$78*$E$17*$E$12 |
| 23 | CUT | =(A$78*C$17-C$20-C | =(A$78*D$17-D$21-D | =(A$78*E$17-E$22)* |
| 24 | I&T | =(A$78*C$17-C$20-C | =(A$78*D$17-D$21-D | =(A$78*E$17-E$22-E |
| 25 | TOTAL | =SUM(C20:C24) | =SUM(D21:D24) | =SUM(E22:E24) |
| 26 | PASSED | =C25/C76 | =D25/D76 | =E25/E76 |
| 27 | GENERATE | =C25/(A71*C76) | =D25/(A72*D76) | =E25/(A73*E76) |
| 28 | UPPER | | | |
| 29 | LIMITS | PHASE ORIGINATED | | |
| 30 | PHASE DETECTED | RA | PD | DD |
| 31 | RA | =POISSONUL($H$30 | | |
| 32 | PD | =POISSONUL($H$30 | =POISSONUL($H$30 | |
| 33 | DD | =POISSONUL($H$30 | =POISSONUL($H$30 | =POISSONUL($H$30 |
| 34 | CUT | =POISSONUL($H$30 | =POISSONUL($H$30 | =POISSONUL($H$30 |
| 35 | I&T | =POISSONUL($H$30 | =POISSONUL($H$30 | =POISSONUL($H$30 |
| 36 | TOTAL | =SUM(C31:C35) | =SUM(D32:D35) | =SUM(E33:E35) |
| 37 | | | | |
| 38 | LOWER | | | |
| 39 | LIMITS | PHASE ORIGINATED | | |
| 40 | PHASE DETECTED | RA | PD | DD |
| 41 | RA | =POISSONLL($H$40 | | |
| 42 | PD | =POISSONLL($H$40 | =POISSONLL($H$40 | |
| 43 | DD | =POISSONLL($H$40 | =POISSONLL($H$40 | =POISSONLL($H$40 |

FROM FIG. 9B

| | | | | |
|---|---|---|---|---|
| =$A$78*$F$17*$F$13 | =$A$78*$G$17*$G$14 | HISTORICAL | | |
| =(A$78+F$17−F$23)* | | SIGMA | | 5.) DPU spread agrees with the |
| | | =NORMSINV(1−$H$26 | | initial sigma as stated in the cell to the left. |
| =SUM(F23:F24) | =G24 | =SUM(C25:G25) | | |
| =F25/F76 | =G25/G76 | =SUM(C26:G26) | | |
| =F25/(A74*F76) | =G25/(A75*G76) | =SUM(C27:G27) | | |
| | | | | |
| | | ALPHA_U | | 6.) Enter upper limits alpha_U. |
| CUT | | 0.05 | I&T | There is only an alpha_U x 100% chance that an |
| =POISSONUL($H$30 | | | | actual will exceed the corresponding |
| =POISSONUL($H$30 | =POISSONUL($H$30 | | | upper limits entry given true historical assumptions. |
| =SUM(F34:F35) | =G35 | =SUM(C36:G36) | | |
| | | | | |
| | | ALPHA_L | | 7.) Enter lower limits Alpha_L. |
| CUT | | 0.1 | I&T | There is only an Alpha_L x 100% chance that an |

FROM FIG. 9C

FROM FIG. 9C / TO FIG. 9F

| | | | | | |
|---|---|---|---|---|---|
| 44 | | CUT | =POISSONLL($H$40) | =POISSONLL($H$40) | =POISSONLL($H$40) |
| 45 | | I&T | =POISSONLL($H$40) | =POISSONLL($H$40) | =POISSONLL($H$40) |
| 46 | | TOTAL | =SUM(C41:C45) | =SUM(D42:D45) | =SUM(E43:E45) |
| 47 | | | | | |
| 48 | DEFECTS OBSERV | | | | |
| 49 | | | PHASE ORIGINATED | | |
| 50 | PHASE DETECTED | | RA | PD | DD |
| 51 | | RA | =$A$78*$C$17*$C$1 | | |
| 52 | | PD | =(A$78*C$17-C$20)* | =$A$78*$D$17*$D$1 | |
| 53 | | DD | =(A$78*C$17-C$20)-C | =(A$78*D$17-D$2)* | =$A$78*$E$17*$E$1 |
| 54 | | CUT | =(A$78*C$17-C$20)-C | =(A$78*D$17-D$21)-D | =(A$78*E$17-E$22)* |
| 55 | | I&T | =(A$78*C$17-C$20)-C | =(A$78*D$17-D$21)-D | =(A$78*E$17-E$22)-E |
| 56 | | TOTAL | =SUM(C51:C55) | =SUM(D52:D55) | =SUM(E53:E55) |
| 57 | ESC. DEFECTS | | =C56/C76 | =D56/D76 | =E56/E76 |
| 58 | CONFIDENCE LEVE | | | CONF. | 0.95 |
| 59 | DPU | | dpmo | | THIS PROGRAM |
| 60 | DPU-UCL | =$H$66+NORMSINV | dpmo-ucl | =1000000*B60/$E$4 | sigma-ucl |
| 61 | DPU | =H66 | dpmo | =1000000*B61/$E$4 | sigma |
| 62 | DPU-LCL | =$H$66+NORMSINV | dpmo-lcl | =1000000*B62/$E$4 | sigma-lcl |
| 63 | | | | | |
| 64 | | | | | |
| 65 | | | | | |

FROM FIG. 9D

| | | | | |
|---|---|---|---|---|
| =POISSONLL($H$40) | | | | |
| =POISSONLL($H$40) | =POISSONLL($H$40) | | | actual will be lower than a corresponding lower limits entry given true historical assumptions. |
| =SUM(F44:F45) | =G45 | | =SUM(C46:G46) | |
| | | | | 8.) Enter the actual defects observed at end of phase. |
| CUT | I&T | | | |
| | | PREDICT SIGMA | | |
| =$A$78*$F$17*$F$1 | =$A$78*$G$17*$G$1 | =NORMSINV(1−$H$5 | | 9.) Predicted sigma. |
| =(A$78*F$17−F$23)*F | | =SUM(C56:G56) | | |
| =SUM(F54:F55) | =G55 | =SUM(C57:G57) | | |
| =F56/F76 | =G56/G76 | | | 10.) CONF. is the probability that the true dpmo, sigma are contained in the interval. |
| | AVERAGE PROGRA(SIMILAR) | | | |
| =NORMSINV(1−$B62) | sigma-ucl | =NORMSINV(1−($H$5) | | |
| =NORMSINV(1−$B$6) | sigma | =NORMSINV(1−$H$5) | | |
| =NORMSINV(1−$B$6) | sigma-lcl | =NORMSINV(1−($H$5) | | |
| | | TOTAL | | |

FROM FIG. 9E

TO FIG. 9H

FROM FIG. 9E / TO FIG. 9H

| | | EST λ* | =C56/C76 | =D56/D76 | =E56/E76 |
|---|---|---|---|---|---|
| 66 | | | | | |
| 67 | | VAR(ESTλ*) | =C56/C76~2 | =D56/D76~2 | =E56/E76~2 |
| 68 | | | | | |
| 69 | A(i) | | B(i,j) | | |
| 70 | | | RA | PD | DD |
| 71 | =(1-$C$10)*(1-$C$11) | RA | =(1-$C$10)*(1-$C$11) | | |
| 72 | =(1-$D$11)*(1-$C$12) | PD | =(1-$C$11)*(1-$C$12) | =(1-$D$11)*(1-$D$12) | |
| 73 | =(1-$E$12)*(1-$E$13) | DD | =(1-$C$12)*(1-$C$13) | =(1-$D$12)*(1-$D$13) | =(1-$E$12)*(1-$E$13) |
| 74 | =(1-$F$13)*(1-$F$14) | CUT | =(1-$C$13)*(1-$C$14) | =(1-$D$13)*(1-$D$14) | =(1-$E$13)*(1-$E$14) |
| 75 | =(1-$G$14) | I&T | =(1-$C$14) | =(1-$D$14) | =(1-$E$14) |
| 76 | | Σ P/B | =C10/C71+C11/C72+ | =D11/D72+D12/D73+ | =E12/E73+E13/E74+ |
| 77 | #def/sum aiqi | | | | |
| 78 | =($E$4*(1-NORMSDI | | =A78*(C17*(C10+(1- | =NORMSINV(1-$C$7 | |
| 79 | | | PHASE ORIGINATED | | |
| 80 | PHASE DETECTED | | RA | PD | DD |
| 81 | | RA | =A78*C17*C10 | | |
| 82 | | PD | =(A78*G17-C20)*C1 | =(A78*D17)*D:1 | |
| 83 | | DD | =(A78*C17-C20-C21) | =(A78*D17-D21)*D12 | =A78*E:7*E12 |
| 84 | | CUT | =(A78*C17-C20-C21- | =(A78*D17-D21-D22) | =(A78*E:7-E22)*E13 |
| 85 | | I&T | =(A78*C17-C20-C21- | =(A78*D17-D21-D22- | =(A78*E:7-E22-E23)* |
| 86 | | Total | =SUM(C81:C85) | =SUM(D82:D85) | =SUM(E83:E85) |
| 87 | | Passed | =C86/C76 | =D86/D76 | =E86/E76 |

FROM FIG. 9F

| | | |
|---|---|---|
| =F56/F76 | =C56/G76 | =SUM(C66:G66) |
| =F56/F76^2 | =C56/G76^2 | =SUM(C67:G87) |
| | | |
| CUT | I&T | |
| | | |
| =(1-$F$13)*(1-$F$14 | (1-$G$14) | |
| =(1-$F$14) | | |
| =F13/F74+F14/F75 | =G14/G75 | |
| | | |
| CUT | I&T | |
| | | |
| =A78*F17*F13 | | init sigma |
| =(A78*F17-F23)*F14 | =A78*G17*G14 | =NORMSINV(1-$H$87 |
| =SUM(F84:F85) | =G85 | =SUM(C86:G86) |
| =F86/F76 | =G86/G76 | =SUM(C87:G87) |

FROM FIG. 9G

PRODUCT DEFECT PREDICTIVE ENGINE

This application claims priority under 35 USC §119(e)(1) of provisional application No. 60/008,116, filed Oct. 30, 1995.

NOTICE

Copyright© 1994 Texas Instruments Incorporated

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

This invention is related to a method and apparatus for predicting product defects.

BACKGROUND OF THE INVENTION

Texas Instruments Incorporated Defense Systems and Electronics Group (DSEG), a 1992 Malcolm Baldrige Quality Award Winner, has developed both the technology and deployment infrastructure for a quality initiative named Six Sigma. Aimed at measuring and reducing variation in a product or service, this technology has allowed many Texas Instruments disciplines, including software development, to quantify progress towards zero defects. Six Sigma originated with a concept that variation in a product or service is the culprit behind defects. Consequently, one can begin with customer requirements and identify units of product or service in which opportunities for defects and actual defects are itemized. Through simple computations, a sigma level of performance may be identified. Higher sigma values represent higher quality levels. Six Sigma performance is equivalent to no more than 3.4 defects per million opportunities. But why do we care about Six Sigma? In terms of cost of quality, a Four Sigma organization cannot compete with a Six Sigma organization A Four Sigma organization will spend as much as 25% of each sales dollar on cost of non-conformance while a Six Sigma organization will spend less than 1%. Organizations performing at Four Sigma will spend 25 times more dollars on rework, etc. than a Six Sigma organization will. Additionally, Six Sigma analysis supports defect causal analysis, prevention and prediction. It has been incorporated into our process improvement program and is part of a widespread training program for all employees of Texas Instruments DSEG. Over the past 5 years, we believe that this technology contributed to our 10X improvement in software fault density. Six Sigma measurement begins with the customers and their requirements. Defect categories may then be identified along with units of product or service. From this framework, defects per unit, opportunities for defects, defects per million opportunities and sigma levels may be computed. Defects per million opportunities (DPMO) may be computed by simply dividing the defects per unit (DPU) by the opportunity count (source lines of delivered software) and then multiplying by 1 million.

The number of defects per million opportunities (DPMO) may be converted into a Sigma level via use of a conversion chart as shown in FIG. 1. Note that changes in the DPMO levels are not linearly proportional to the Sigma levels. Thus, for an organization of higher levels of sigma performance, smaller amounts of DPMO improvement are needed to achieve the same sigma improvement as that of an organization at a lower level of sigma performance. Sigma measures support benchmarking of quality levels.

In the development of software there are generally at least five stages—the first being the requirement stage (RA); the second being the preliminary design stage (PD); the third being the design detail stage (DD); the fourth being the coding stage (CUT), and the fifth being the integrating and testing stage (I&T). Defects in software development activity represent rework, resulting in increased cost and cycle times.

While it is known to make estimates of escaping defects mode during a latter phase of integration and test using Weibull curve fittings, there is no known solution for long range prediction of the number of escaping defects.

SUMMARY OF THE INVENTION

In accordance with one preferred embodiment of a present invention, there is provided a method and statistical tool apparatus for predicting defects in products. The method according to one embodiment includes the step of providing historical data of defects at different stages of development and a value representing a goal for escaping defects. Also provided is the planned total number of opportunities for defects. The goal for number of escaping defects and planed number of opportunities for defects are backsolved to determine the total number of defects. The total defects are distributed as a function of the historical data to provide prediction of defects at the different stages of development.

The apparatus according to one preferred embodiment of the present invention comprises a processor, a memory, a keyboard, a drive for loading a software package and a display. The processor is loaded with a program for storing historical data indicating the historical pattern of defect containment in the stages of development. The processor has stored therein algorithms for computing sigma values based on opportunities and escaping defects in the stages and including an algorithm for backsolving from historical data.

These and other features of the invention will be apparent to those skilled in the art from the following detailed description of the invention, taken together with the accompanying drawings.

DESCRIPTION OF THE DRAWINGS

FIG. 6 illustrates the historical sheet;

FIG. 7 illustrates the current sheet;

FIG. 8 illustrates a summary sheet; and

FIG. 9 illustrates a current sheet with equations embedded therein.

DESCRIPTION OF PREFERRED EMBODIMENT

The Software Sigma process according to the present invention stresses defect prevention, monitoring of defect levels, causal analysis for process improvement, and the sigma metric to predict, early in the development cycle, the level of escaping defect delivered with the product. A unique aspect of the statistical model we construct to predict escaping defects is the use of project defect phase containment data in a dual manner. As historical data, phase containment data, converted to conditional probabilities, is used to model the current state of a projects software process's effectiveness to prevent and capture defects. During the development phase, actual phase containment data is captured and utilized to make the prediction of escaping defects from the finished product.

Variation in performance of a quality attribute causes defects. Performance of a quality attribute is often assumed to follow a normal distribution (bell shape curve) which is centered on a given mean (average) value. The potential for defects arises when the tails of the performance curve fall outside given specification limits. Adapted to software, there is no assumption made about distribution normality. In fact, distributions of interest appear to follow Poisson or Weibull distributions.

Figure 1:
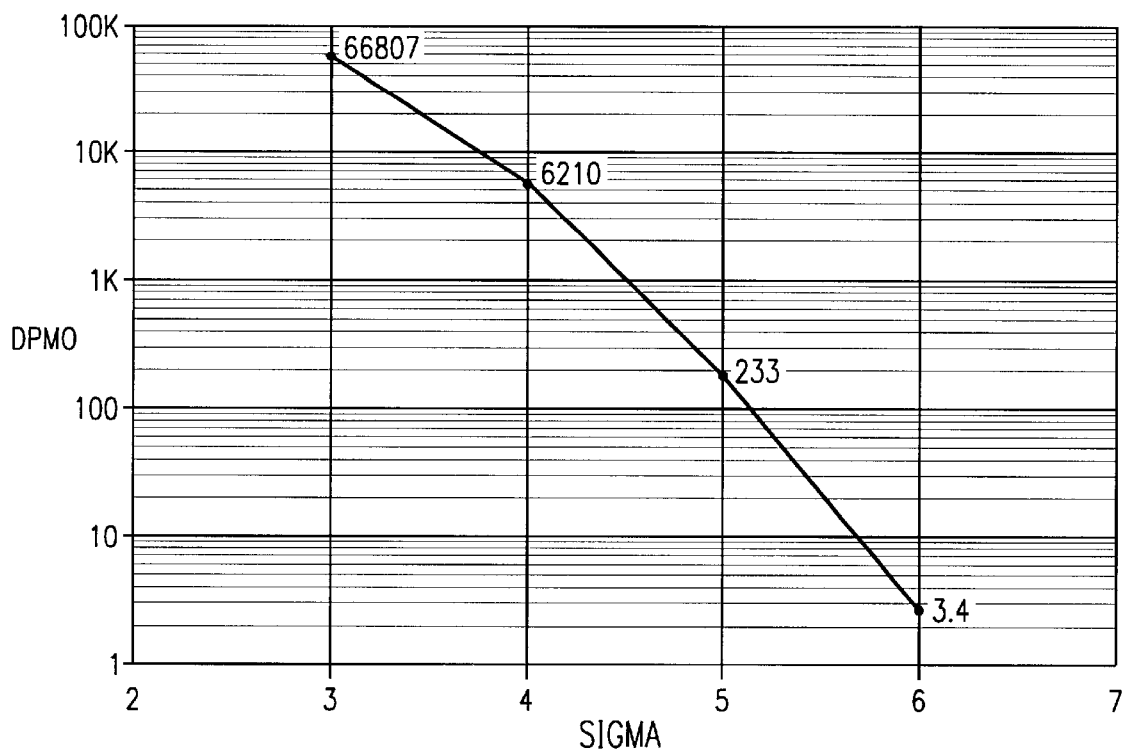
FIG. 1 is a conversion chart of DPMO to Sigma.
Figure 2:
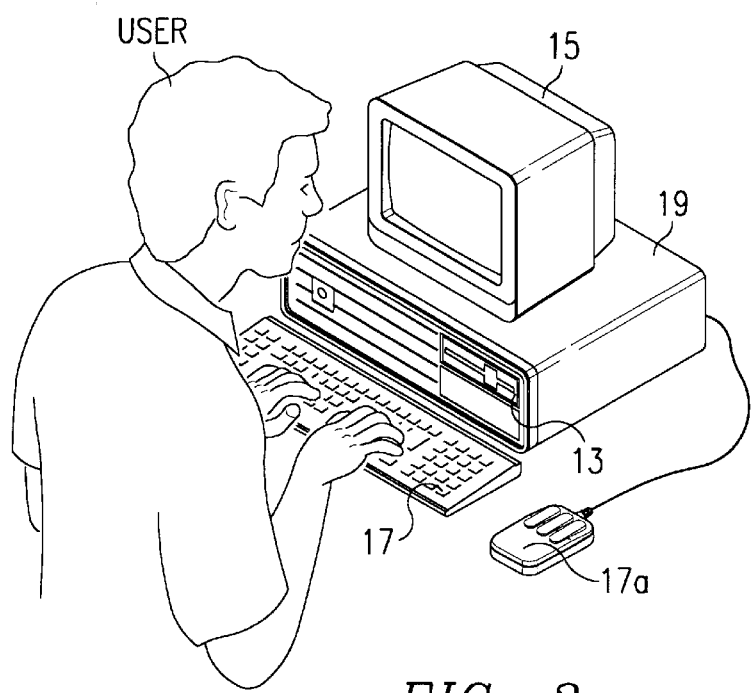
FIG. 2 is a diagram of the personal computer used for the engine according one embodiment of the present invention.
Figure 3:
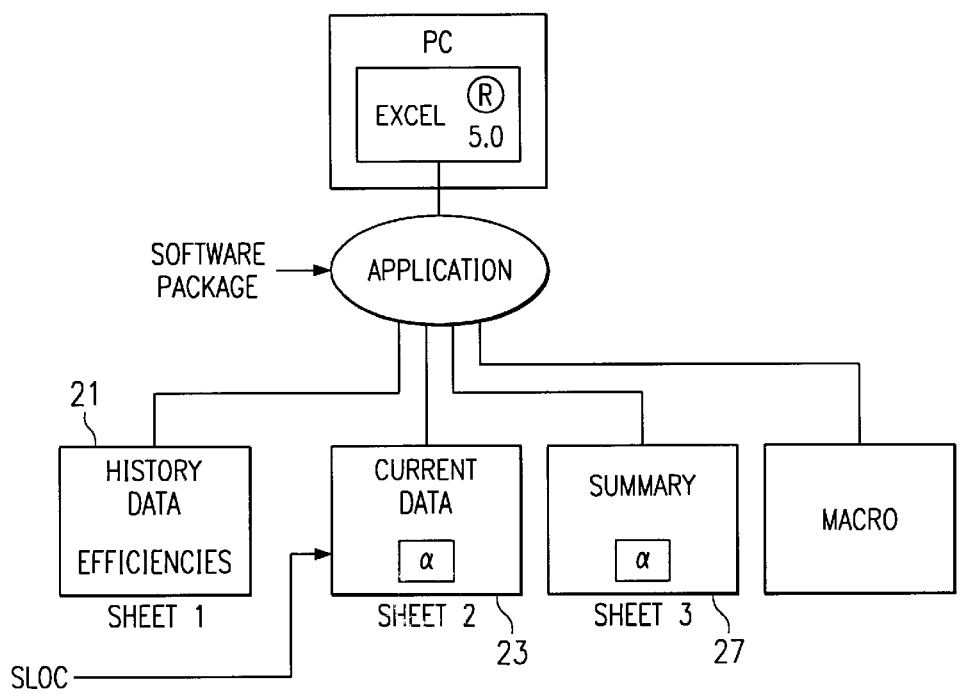
FIG. 3 is a system diagram according to one embodiment of the present invention.

In accordance with one embodiment of the present invention, a software sigma predictive engine is provided for predicting defects in software. The engine comprises, for example, a personal computer (PC) 19 with a processor 11, a storage unit 13 (such as a disk drive), a monitor 15, and input device such as a keyboard 17 and mouse 17a as shown in FIG. 2. The processor is loaded with a software spreadsheet program such as Microsoft Excel 5.0. The operation is implemented as a workbook in three sheets. The user enters data in two sheets, the historical sheet 21 and the current sheet 23. See diagram in FIG. 3. A third sheet 27, the summary sheet, automatically summarizes the decisions made, actual observed defects, the predicted number of escaping defects, and statistical confidence intervals qualifying the "goodness" of the prediction. There is also a fourth sheet or page which contains the original computer program to calculate the Poisson probabilities.

Figure 4:
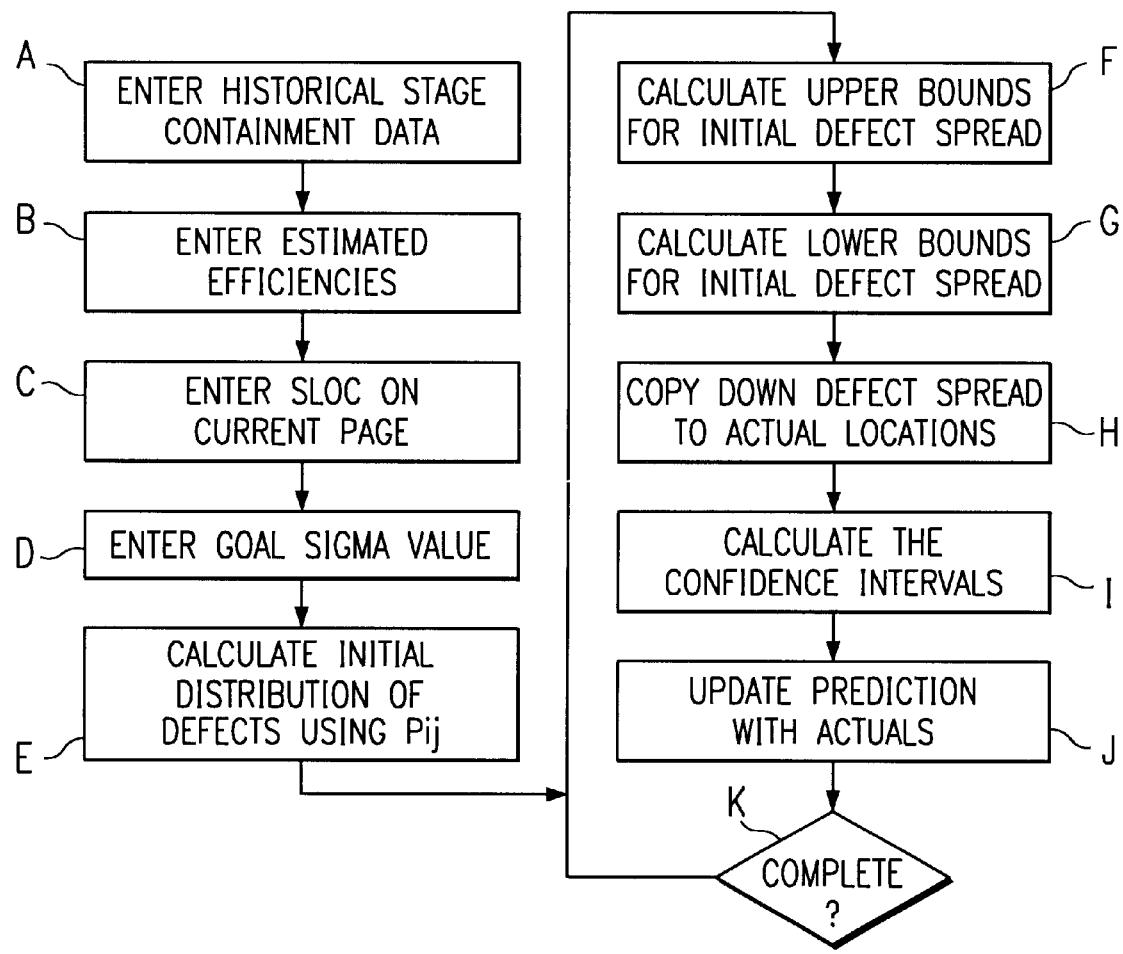
FIG. 4 is a flow chart of the operation according to one embodiment of the present invention.

In accordance with one embodiment of the present invention illustrated by the flow chart of FIG. 4, historical defect containment data is entered (step A) in the cells of Excel 5.0 as a workbook in the historical sheet as a stage defect containment matrix. The user enters historical defect containment data for the various stages of design in a defect containment matrix at cell locations. This is arrived at from previous designs and detections of defects at these stages. Based on estimated efficiency of detection of defects entered (Step B), the inspection efficiencies are calculated and copied to the second sheet or page called the current sheet 27. The estimated overall efficiency of the process to detect DPU of each type over all stages is entered. The number of software lines of code (SLOC) is entered on the current workbook sheet 23 (step C) and the goal sigma value is entered on the current workbook sheet 23 (step D). Each SLOC represents a defect opportunity. Based on the goal sigma values and lines of code (SLOC) entered the total number of observed defects are calculated. The initial distribution of these defects is calculated using probability $P_{ij}$ (step E) of a defect in ith step of being detected and removed in jth step. The upper bounds for initial defect spread is calculated (step F) and the lower bounds for initial defect spread is calculated (step G). The defect spread is copied down to the actual locations in the current sheet (step H). The confidence interval is then calculated (step I). The statistical model used views the number of defects generated in each stage as Poisson random variables which are independent between the different stages of the development process. These random numbers of defects are then subjected to the random process of defect detection and the resulting number of detected, and undetected, defects are random variables whose distributions remain Poisson. The total number of detected defects, as well as the total number of escaping defects, then can be represented as the sum of independent Poisson random variables and it is this that makes it possible to develop an unbiased estimator for the mean number of escaping defects. An estimate of the variance of the estimator, along with the asymptotic normality of its distribution, allows for the calculation of an approximate statistical confidence interval for the mean number of escaping defects, as well as an approximate prediction interval for the actual number of escaping defects. These estimates and intervals are automatically calculated and displayed in the spreadsheet, along with corresponding estimates and intervals for the process sigma level. The initial prediction is up-dated (step J) with actual data until all actuals have been entered (step K). As the design progresses and actual defects are measured the actual defects are compared to the error bounds to determine if there is consistency between the data and the model and to see if the sigma goal will be reached.

Figure 5:
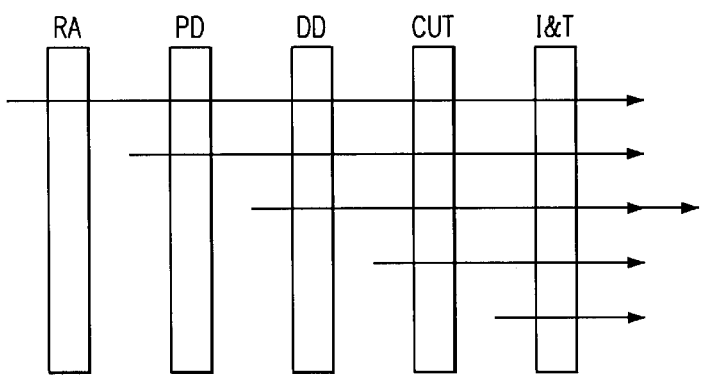
FIG. 5 illustrates defect flow analysis.

Referring to FIG. 5, there is illustrated the defect flow analysis for a software design project which starts with RA as a requirement and proceeds to the second Step PD, which is preliminary design, which proceeds to a detailed design (DD) which then proceeds to actual generation of code (CUT) and then to the fifth step of integration and test (I&T). FIG. 5 indicates the defect data flow model used to estimate the number of escaping defects for a typical software product. Some of the final defects from the requirements (RA) escape through the preliminary design, the detailed design, the coding and integration and test. Likewise some uncorrected defects in the preliminary design (second line) escape and pass on to detailed design, through the coding, and through integration and test. Some defects at the detailed design escape through coding and integration and test. Some coding errors escape through integration and test. Some integration and test errors escape. The total escaped defects per million opportunities is the defects per million opportunities (DPMO) which is converted to the Sigma level.

The historical sheet shown in FIG. 6 is the primary location for loading historical data to prime the pump in preparation for the collection of actual defect data during the project. The primary software sigma measure is defects per unit (DPU). When we associate opportunities and a chance for non-conformance, we are providing a measure of complexity that allows us to compare products of different size. The use of opportunities as a common denominator to compute defects per million opportunities (dpmo) is a way to normalize the different sizes between both intermediate and final product. Enter in cells C4:G8 of Excel 5.0 historical workbook sheet the defects for each stage observed from historical data or best engineering judgement. This data represents the pattern of defects detected across the project phases. For example the defects originated at requirements stage RA and detected at RA is 30. The defects detected at Integration and Test originated 1 at RA, 1 at PD, 5 at DD, 17 at CUT, and 3 at I&T. It represents the pattern most likely to occur and is transformed into conditional probabilities in cells C15:G19 labeled "inspection efficiencies". These probabilities are automatically calculated in cells C15:G19 of the historical sheet: and are copied onto the current and summary sheets. Represented as percentages, these are the conditional probabilities that a defect generated in a prior or same stage will be observed in the current stage. For example, the total RA defects is 64 and the defect at C4 is 30 so the percentage is 30/64×100%=47. These percentages are then derated by the estimated efficiencies. The percentages listed represent derating of perfect capture which the conditional probabilities would suggest. In fact, the conditional probabilities are adjusted by the estimated efficiency percentages to indicate that our observations are not 100% efficient. These multipliers may be estimated for programs with complete data, but without that one must use best engineering judgement. The spreadsheet shown in FIG. 6 has these values preset at 95% for requirements DPU, 94% for preliminary design defects, 93% for detailed design defects, 92% for code and unit test and 90% for integration and test. Screening effectiveness percentages are conditional probabilities estimated from historical stage containment data and may be revised.

The initial values in the current sheet (FIG. 7) allow the developer to model his environment and the effect in terms of DPU for given values of screen effectiveness and assumed sigma for the product. As actual data is entered for each phase, it overrides the DPU computed by the spreadsheet, which were needed to obtain the assumed goal sigma. From this point in time forward, to improve the product's sigma it is necessary to reduce the DPU observed at each stage by improved software process steps. The screen detection probabilities may be increased by improving the screens ability to detect both in-stage and out-of-stage DPU. The process is improved by finding most DPU in early stages of development.

The product name, delivered SLOC (Software Lines of Code) and goal sigma are entered at E4 and E5 in the shaded blocks at the top of the current sheet illustrated in FIG. 7. Note that the goal sigma may be based upon Fault Density Data of similar products or be the development goal the project expects to attain.

The DPU count by percentage in the historical sheet based on defects observed are computed and copied to in the current sheet. These percentages are used to spread the DPU in the following cells with planning DPU spread by stage. The percentages may be adjusted to reflect engineering judgement if required.

Using the percent spread, knowledge of the goal sigma of E5, the delivered SLOC E4 and the probabilities of detection, the engine back calculates the DPU needed in each phase to reach the sigma goal. These DPU are copied to the cells (C51, G55) called "defects observed" where actuals will overwrite these estimates as they are received. Note that the number of DPU passed to the next phase and the number generated (greater than observed) are also indicated below these cells. First the total DPU are calculated from the sigma value and SLOC and then based on percentage in C10:G14. The initial values in C51:G55 are entered. This predictive framework is based on assumptions.

Assume a process has N steps or stages. In step i, $L_i$ defects are introduced. Assume $L_i$ has a Poisson distribution with mean $\lambda_i$ and that $L_i$ and $L_j$ are independent for $i \neq j$. Assume also that a defect introduced in the ith step has a probability $P_{ij}$ of being detected and removed in the jth step, $j \geq i$, and that the detection of defects forms a Bernoulli process and the detection of one defect is independent of the detection of other defects. It can be shown that the number of defects detected in stage, $K_{ii}$, has a Poisson distribution with mean $\lambda_i P_{ii}$ and that the number of defects escaping from the stage they were introduced, $L_i - K_{ii}$, has a Poisson distribution with mean $\lambda_i(1 - P_{ii})$. Furthermore, it can be shown that these random variables are independent.

This leads to the fact that the numbers of defects of a specific origin, found in each stage, have Poisson distributions and are all independent of each other. Since the number of defects which escape from step i to step i+1, $L_i - K_{ii}$, has a Poisson distribution with mean $\lambda_i(1 - P_{ii})$, and since these defects each have a probability $P_{ii+1}$ of being detected, the number of stage i defects detected in step i+1, $K_{ii+1}$, has a Poisson distribution with mean $(1 - P_{ii})P_{ii+1}\lambda_i$. In general, the number of step i defects detected (and removed) in the jth step is given by $K_{ij}$ and has a Poisson distribution with mean $(1 - P_{ii})(1 - P_{ii+1}) \ldots (1 - P_{ij-1}) P_{ij}\lambda_i$. Furthermore, these $K_{ij}$ are all independent. In addition, since they are simply the sum of independent Poisson variables, the total number of defects detected in each stage, the total number of detected defects introduced at each stage, and the total number of escaping defects all have Poisson distributions.

Let $$L_i^* = L_i \sum_{j=i}^{N} K_{ij}$$

be the number of step i defects which have not been detected after the Nth step. By induction, it can be shown that $L_i^*$ has Poisson distribution. The mean of $L_i^*$ is given by $$\lambda_i^* = \lambda_i \prod_{j=i}^{N} (1 - P_{ij}) = \lambda_i(1 - P_{ii})(1 - P_{ii+1}) \ldots (1 - P_{iN}) = a_i \lambda_i$$

where $$a_i = \prod_{j=i}^{N} (1 - P_{ij})$$

Let $$L^* = \sum_{i=1}^{N} L_i^*$$

be the total number of escaping defects. Since the $L_i^*$ are independent Poisson variables, $L^*$ has a Poisson distribution with mean $$\lambda^* = \sum_{i=1}^{N} \lambda_i^* = \sum_{i=1}^{N} \lambda_i \prod_{j=i}^{N} (1 - P_{ij}) = \sum_{i=1}^{N} a_i \lambda_i$$

Estimators

As stated before, the $K_{ij}$ are independent, Poisson variables with means $$(1 - P_{ii})(1 - P_{ii+1}) \ldots (1 - P_{ij-1})P_{ij}\lambda_i = \frac{a_i P_{ij} \lambda_i}{b_{ij} = \prod_{k=j}^{N}(1 - P_{ik})} = \frac{a_i P_{ij} \lambda_i}{b_{ij}}$$

where $$b_{ij} = \prod_{k=j}^{N} (1 - P_{ik})$$

This means that $$K_{i.} = \sum_{j=i}^{N} K_{ij}$$

the total number of defects from stage i which were detected, has a Poisson distribution with mean and variance given by:

$$E(K_{i.}) = a_i \lambda_i \sum_{j=i}^{N} \frac{P_{ij}}{B_{ij}} \quad \text{and} \quad Var(K_{i.}) == a_i \lambda_i \sum_{j=i}^{N} \frac{P_{ij}}{b_{ij}}$$

The $K_{i.}$ also form a sufficient statistic for estimating the $\lambda_i$, and hence the $\lambda_i^*$ and $\lambda^*$.

The maximum likelihood estimators (MLE) for the $\lambda_i$ are given by $$\hat{\lambda}_i = \frac{K_i}{a \sum_{j=i}^{N} \frac{P_{ij}}{b_{ij}}}$$

and this the MLE for $\lambda^*$ is given by $$\hat{\lambda}^* = \sum_{j=i}^{N} \hat{\lambda}_i^* \sum_{j=i}^{N} a_i \hat{\lambda}_1 = \frac{K_i}{a \sum_{j=i}^{N} \frac{P_{ij}}{b_{ij}}}$$

Since $$E(\hat{\lambda}^*) = \sum_{j=i}^{N} a_i \lambda_i = \lambda^*$$

$\hat{\lambda}^*$ is also an unbiased estimator of $\lambda^*$ with variance given by.

$$Var(\hat{\lambda}^*) = \sum_{j=i}^{N} \frac{Var(K_1)}{\left(\sum_{j=i}^{N} \frac{P_{ij}}{b_{ij}}\right)^2} = \sum_{j=i}^{N} \frac{a_i \lambda_i}{\sum_{j=i}^{N} \frac{P_{ij}}{b_{ij}}}$$

which can be estimated by $$Var(\hat{\lambda}^*) = \sum_{i=1}^{N} \frac{K_i}{\left(\sum_{j=i}^{N} \frac{P_{ij}}{b_{ij}}\right)^2}$$

For the above software development/inspection process N=5. Thus $a_1 = (1-P_{11})(1-P_{12})(1-P_{13})(1-P_{14})(1-P_{15})$ $a_2 = (1-P_{22})(1-P_{23})(1-P_{24})(1-P_{25})$ $a_3 = (1-P_{33})(1-P_{34})(1-P_{35})$ $a_4 = (1-P_{44})(1-P_{45})$ $a_5 = (1-P_{55})$ $\lambda^* = a_1\lambda_1 + a_2\lambda_2 + a_3\lambda_3 + a_4\lambda_4 + a_5\lambda_5$ and $$\hat{\lambda}^* = \frac{K_i}{a_i \sum_{j=i}^{5} \frac{P_{ij}}{b_{ij}}}$$

with $$\hat{\lambda}^* = a_1\hat{\lambda}_1 + a_2\hat{\lambda}_2 + a_3\hat{\lambda}_3 + a_4\hat{\lambda}_4 + a_5\hat{\lambda}_5 =$$

$$\frac{K_1}{\sum_{j=i}^{5} \frac{P_{1j}}{b_{1j}}} + \frac{K_2}{\sum_{j=2}^{5} \frac{P_{2j}}{b_{2j}}} + \frac{K_3}{\sum_{j=3}^{5} \frac{P_{3j}}{b_{3j}}} + \frac{K_4}{\sum_{j=4}^{5} \frac{P_{4j}}{b_{4j}}} + \frac{K_5}{\frac{P_{55}}{b_{55}}}$$

$$Var(\hat{\lambda}^*) = \frac{K_1}{\left(\sum_{j=i}^{5} \frac{P_{1j}}{b_{1j}}\right)^2} + \frac{K_2}{\left(\sum_{j=2}^{5} \frac{P_{2j}}{b_{2j}}\right)^2} +$$

$$\frac{K_3}{\left(\sum_{j=3}^{5} \frac{P_{3j}}{b_{3j}}\right)^2} + \frac{K_4}{\left(\sum_{j=4}^{5} \frac{P_{4j}}{b_{4j}}\right)^2} + \frac{K_5}{\left(\frac{P_{55}}{b_{55}}\right)^2}$$

The block of cells C31:G35 are the upper limits and these are calculated based upon Poisson probability tails. The numbers represent upper bounds for actual DPU counts entered in the defects observed block or cells. The probability that one of the actual DPU values is greater than the corresponding upper bound cell, given our historical assumptions, is at most Alpha_U. In other words, there is at most an Alpha_U×100% chance that an actual number of defects will exceed the corresponding upper limit, given true historical assumptions. If several actuals, say n, exceed their corresponding upper bounds, then there is at most an (Alpha_U)$^n$×100% chance that the historical assumptions are correct. To reject the historical assumptions there are two alternatives hypothesis:

First, the DPU may exceed expected results due to superior process which is finding more DPU.

Second, the process is not as effective at preventing DPU from occurring in the process, resulting in more defects to be found. Only experienced engineering judgement can determine the correct conclusion. In any case, the DPU escaping and product sigma will be lower than the initial goal. A fourth page in Excel Macros contains the original computer programs to calculate Poisson probabilities.

The block of cells C41:G45 are lower limits are calculated based upon Poisson probability tails. The numbers represent lower bounds for actual DPU counts entered in the defects observed block of cells. The probability that one of the actual DPU values is less than the corresponding lower bound, given our historical assumptions, is at most Alpha_L. To reject the historical assumptions there are two alternative hypothesis:

First, the DPU may be less than expected due to an inferior inspection process which is finding fewer defects than expected.

Second, the process is more effective than expected at preventing defects from occurring in the process, resulting in fewer defects to be found. Only experienced engineering judgement can determine the correct conclusion.

The block of cells C51:G55 is initialized to the planning DPU spread by stage. As actual DPU data is collected by the project, it is entered to overwrite this data. Finally, the data contains only actual data and based upon actual data observed, the sigma of escaping DPU is calculated.

The confidence level E58 represents the probability that the true values of DPU, dmpo, and sigma in the corresponding cells are within the upper and lower bounds indicated. The sigma interval labeled in this program represents a confidence interval predicting the sigma for escaping DPU based upon this programs actual data. The interval labeled average represents a confidence interval based upon repeating the experiment of collecting actuals multiple times for this program. The estimator can be used to generate an approximate confidence interval for the mean number of escaping defects, as well as an approximate prediction interval for the actual number of escaping defects.

The first block of cells in the Summary page as illustrated in FIG. 8 reminds the reviewer of the historical stage containment data which has been used to model process effectiveness at defect observation. The second block of cells represents the data set of actual stage containment DPU for the current project. This data resulted from overwriting the planning DPU spread on the current sheet into the defects observed block. The confidence level set on the current page is copied to the summary page. It represents the probability that the true values of DPU, dmpo, and sigma in the corresponding cells are within the upper and lower bounds indicated. The sigma interval labeled in this program represents a confidence interval predicting the sigma for escaping DPU based upon this programs actual data. The interval labeled average represents a confidence interval for the long-term average DPU level for all projects with the same defect generation and inspection characteristics.

In FIG. 9 there is illustrated a current sheet with equations behind the cells. Cells C81:G86 calculate the total defects. The Poisson upper limits are cells C31:G35. The Poisson lower limits are in cells C41:G45.

Other Embodiments

Although the present invention and its advantages have been described in detail, it should be understood that various changes, substitutions and alterations can be made herein without departing from the spirit and scope of the invention as defined by the appended claims.

What is claimed is:

1. A computer implemented method for predicting product defects of a future product comprising the steps of:
   storing in a first database historical data of defects at different stages of development from a past product and a value representing corresponding escaping defects;
   providing a first signal representing a first value of a predicted number of opportunities for defects and a second signal representing a second value of planned defects per opportunities for said future product;
   backsolving said first and second values represented by said first and second signals to provide a third signal representing total predicted defects;
   generating a second database of predictive defects for different stages of development for said future product as a function of said first database historical data and said first and second signals; and
   displaying said predictive defects at different stages of development for said future product.

2. The method of claim 1 wherein said method is for predicting software defects and said predictive opportunities for defects are the number of software lines of code.

3. The method of claim 2 wherein said value representing corresponding escaping defects is a sigma value dependent on defects per million opportunities.

4. The method of claim 2 including the steps of changing the number of defects in said second database for the different stages from predictive defects to actual defects as actual defects are detected, producing a fourth signal representing actual defects, and displaying said actual defects.

5. The method of claim 1 wherein said value representing corresponding escaping defects is a sigma value dependent on defects per million opportunities.

6. The method of claim 1 including the steps of changing the number of defects in said second database for the different stages from predictive defects to actual defects as actual defects are detected, producing a fourth signal representing actual defects, and displaying said actual defects.

7. A method of software defect prediction of a current product being developed comprising the steps of:
   constructing project phase defect containment data from past one or more projects and quality level in terms of escaping defects;
   converting said project containment data to conditional probabilities;
   providing a first signal representing software lines of code and a second signal representing quality level in terms of escaping defects;
   generating a database of predictive defects at different stages of development for said current product as a function of said conditional probabilities and said first and second signals; and
   displaying said predictive defects at different stages of development for said current product.

8. The method of claim 7 including the steps of changing the number of defects in said database for the different stages from predictive defects to actual defects as actual defects are detected, producing a third signal representing actual defects, and displaying said actual defects.

9. A computer implemented method of predicting software defects in a computer program comprising the steps of:
   generating and displaying a historical sheet and a current sheet for providing data representing defects at different stages of software design;
   entering data in said historical sheet representing defects at different stages of design and sigma value corresponding thereto based on previous designs;
   entering estimated efficiencies of said historical data;
   generating and displaying percentage of distribution of defects based in efficiencies;
   entering proposed number of lines of code and sigma value for current code to be predicted;
   backsolving said sigma value and said lines of code to provide a count of defects; distributing said defects based on said percentage of distribution of defects; providing said defects on said current sheet; displaying said current sheet;
   calculating upper bounds for initial defect spread;
   displaying said upper bounds for observed defect spread;
   calculating lower bounds for initial defect spread; and
   displaying said lower bounds for observed defect spread.

10. A software predictive apparatus comprising:
    means, interactive with user, for storing historical data of defects at different stages of software development;
    means, coupled to said storing means, for calculating sigma values;
    means, coupled to said storing means and calculating means, for displaying said historical data and said sigma values; and means responsive to entering new sigma values for back-solving said new sigma values to provide a distribution of predictive defects at different stages of software development.

11. A software defect predictive engine for a current software design comprising:

a processor;

a first computer storage for storing under program control first electrical signals representing historical data on defects at different stages of a previous software design;

said processor responsive to said first electrical signals and estimated prediction efficiencies for providing second electrical signals representing predicted defects at different stages of said current software design;

a second computer storage for storing said second electrical signals representing predicted defects at different stages of said current software design;

said processor responsive to lines of code entered and sigma value entered for calculating and for providing third electrical signals representing defects projected and responsive to said third electrical signals for calculating and for providing fourth electrical signals representing a final distribution of defects for the said current software design;

said second computer storage storing said fourth electrical signals; and a display coupled to said processor and said second computer storage and responsive to said fourth electrical signals for displaying said final distribution of defects of said current software design.

12. A software defect predictive engine for a current software design comprising:

a processor;

a first computer storage for storing under program control first electrical signals representing historical data on defects at different stages of a previous software design;

said processor responsive to said first electrical signal and estimated prediction efficiencies for providing second electrical signals representing predicted defects at different stages of said current software design;

a second computer storage for storing said second electrical signals representing predicted defects at different stages of said current design;

said processor responsive to lines of code entered and sigma value entered for calculating and for providing third electrical signals representing total defects projected and responsive to said third electrical signals for calculating and for providing fourth electrical signals representing a final distribution of defects for the current software design;

said second computer storage storing said fourth electrical signals; and a display coupled to said processor and said second computer storage and responsive to said fourth electrical signals for displaying said final distribution of defects of the current software program and for displaying a prediction of defects in the current software design.

* * * * *